(12) United States Patent
Guzman et al.

(10) Patent No.: US 9,993,990 B2
(45) Date of Patent: *Jun. 12, 2018

(54) THERMAL INSULATION

(71) Applicant: CTA Acoustics, Inc., Madison Heights, MI (US)

(72) Inventors: Shawn Jose Guzman, Grosse Pointe, MI (US); Matthew Bargo, II, Corbin, KY (US); Demetrio Bellocido Borja, London, KY (US); James Joseph Pike, Grosse Pointe, MI (US)

(73) Assignee: CTA Acoustics, Inc., Madison Heights, MI (US)

( * ) Notice: Subject to any disclaimer, the term of this patent is extended or adjusted under 35 U.S.C. 154(b) by 258 days.

This patent is subject to a terminal disclaimer.

(21) Appl. No.: 14/673,525

(22) Filed: Mar. 30, 2015

(65) Prior Publication Data
US 2015/0266265 A1 Sep. 24, 2015

Related U.S. Application Data

(63) Continuation-in-part of application No. 13/826,943, filed on Mar. 14, 2013, now Pat. No. 9,193,131.

(51) Int. Cl.
*B32B 5/06* (2006.01)
*B32B 5/08* (2006.01)
(Continued)

(52) U.S. Cl.
CPC ............... *B32B 5/06* (2013.01); *B32B 5/022* (2013.01); *B32B 5/08* (2013.01); *B32B 7/12* (2013.01); *B32B 15/08* (2013.01); *B32B 15/14* (2013.01); *B32B 15/20* (2013.01); *B32B 27/12* (2013.01); *B32B 37/12* (2013.01); *B32B 2262/0276* (2013.01); *B32B 2262/101* (2013.01); *B32B 2262/12* (2013.01); *B32B 2262/14* (2013.01);
(Continued)

(58) Field of Classification Search
CPC ........................................................ B32B 5/06
See application file for complete search history.

(56) References Cited

U.S. PATENT DOCUMENTS

| 3,000,772 A | 9/1961 | Lunn |
| 3,211,253 A | 10/1965 | Gonzalez |

(Continued)

FOREIGN PATENT DOCUMENTS

| CA | 2459341 | 3/2003 |
| CA | 2903245 | 8/2017 |
| WO | 2014159932 | 10/2014 |

OTHER PUBLICATIONS

International Searching Authority, International Search Report and Written Opinion for corresponding PCT Application No. PCT/US2014/025478 dated Jun. 27, 2014.

(Continued)

*Primary Examiner* — William P Watkins, III
(74) *Attorney, Agent, or Firm* — Middleton Reutlinger (57) ABSTRACT

A thermal shield material includes a laminate of a homogeneously blended fiber mat of fiberglass, polyester and bi-component polyester, a plurality of tufts disposed on only one side of mat, the tufts formed by needling the mat from a single side, first and second adhesive layers disposed on first and second sides of the blended fiber mat, respectively, at least one of the adhesive layers being a heat activated adhesive and, a foil layer on the heat activate adhesive layer.

28 Claims, 3 Drawing Sheets

(51) Int. Cl.
  *B32B 15/14* (2006.01)
  *B32B 7/12* (2006.01)
  *B32B 15/08* (2006.01)
  *B32B 15/20* (2006.01)
  *B32B 27/12* (2006.01)
  *B32B 5/02* (2006.01)
  *B32B 37/12* (2006.01)

(52) U.S. Cl.
  CPC ....... *B32B 2305/20* (2013.01); *B32B 2305/28* (2013.01); *B32B 2307/102* (2013.01); *B32B 2307/304* (2013.01); *B32B 2307/306* (2013.01); *B32B 2307/3065* (2013.01); *B32B 2309/10* (2013.01); *B32B 2311/00* (2013.01); *B32B 2367/00* (2013.01); *B32B 2509/00* (2013.01); *B32B 2605/08* (2013.01); *Y10T 428/24033* (2015.01); *Y10T 428/24636* (2015.01); *Y10T 442/608* (2015.04); *Y10T 442/616* (2015.04); *Y10T 442/656* (2015.04)

(56) References Cited

U.S. PATENT DOCUMENTS

| | | |
|---|---|---|
| 3,396,070 A | 8/1968 | Gambill et al. |
| 3,489,639 A | 1/1970 | Spencer |
| 3,687,850 A | 8/1972 | Gagin |
| 3,725,122 A | 4/1973 | Reinhard et al. |
| 3,991,848 A | 11/1976 | Davis |
| 4,101,704 A | 7/1978 | Hiles |
| 4,237,180 A | 12/1980 | Jaskowski |
| 4,315,048 A | 2/1982 | Beghelli et al. |
| 4,441,580 A | 4/1984 | Webster |
| 4,496,024 A | 1/1985 | Wolf et al. |
| 4,507,342 A | 3/1985 | Kielbania, Jr. |
| 4,522,876 A | 6/1985 | Hiers |
| 4,926,963 A | 5/1990 | Snyder |
| 4,966,799 A | 10/1990 | Lucca et al. |
| 5,055,341 A | 10/1991 | Yamaji et al. |
| 5,094,318 A | 3/1992 | Maeda et al. |
| 5,108,833 A | 4/1992 | Noguchi et al. |
| 5,272,000 A | 12/1993 | Chenoweth et al. |
| 5,300,360 A | 4/1994 | Kocsis et al. |
| 5,456,513 A | 10/1995 | Schmidt |
| 5,536,556 A | 7/1996 | Juriga |
| 5,601,910 A | 2/1997 | Murphy et al. |
| 5,670,235 A | 9/1997 | Stricker et al. |
| 5,681,072 A | 10/1997 | Stricker |
| 5,759,659 A | 6/1998 | Sanocki et al. |
| 5,824,973 A | 10/1998 | Haines et al. |
| 5,892,187 A | 4/1999 | Patrick |
| 5,952,248 A | 9/1999 | Horton |
| 5,962,594 A | 10/1999 | Raetzsch et al. |
| 5,981,046 A | 11/1999 | Masui et al. |
| 6,001,437 A | 12/1999 | Thorpe et al. |
| 6,092,622 A | 7/2000 | Hiers et al. |
| 6,109,389 A | 8/2000 | Hiers et al. |
| 6,345,688 B1 | 2/2002 | Veen et al. |
| 6,530,453 B1 | 3/2003 | Miura et al. |
| 6,539,955 B1 | 4/2003 | Tilton et al. |
| 6,598,701 B1 | 7/2003 | Wood et al. |
| 6,599,600 B1 | 7/2003 | Wyman |
| 6,601,673 B2 | 8/2003 | Murakami et al. |
| 6,648,547 B2 | 11/2003 | Jones et al. |
| 6,955,845 B1 | 10/2005 | Poole et al. |
| RE39,260 E | 9/2006 | Byrd et al. |
| 7,207,744 B2 | 4/2007 | Jones, IV et al. |
| 7,410,920 B2 | 8/2008 | Davis |
| 7,837,009 B2 | 11/2010 | Gross et al. |
| 7,878,301 B2 | 2/2011 | Gross et al. |
| 7,918,313 B2 | 4/2011 | Gross et al. |
| 7,928,025 B2 | 4/2011 | Shipley et al. |
| 8,118,177 B2 | 2/2012 | Drapela et al. |
| 9,193,131 B2 | 11/2015 | Guzman et al. |
| 2003/0059562 A1 | 3/2003 | Lien et al. |
| 2003/0106741 A1 | 6/2003 | Tompson et al. |
| 2003/0148693 A1 | 8/2003 | Erb, Jr. et al. |
| 2004/0028958 A1 | 2/2004 | Assink et al. |
| 2004/0131836 A1 | 7/2004 | Thompson |
| 2005/0202740 A1 | 9/2005 | Tilton et al. |
| 2006/0046594 A1 | 3/2006 | Starrett |
| 2006/0121811 A1 | 6/2006 | Mangold et al. |
| 2006/0137799 A1 | 6/2006 | Haque et al. |
| 2006/0237130 A1 | 10/2006 | Thompson |
| 2007/0152488 A1 | 7/2007 | York et al. |
| 2007/0200417 A1 | 8/2007 | York et al. |
| 2009/0188091 A1 | 7/2009 | Van Kerrebrouck et al. |
| 2009/0252941 A1 | 10/2009 | Mueller et al. |
| 2009/0252943 A1 | 10/2009 | Takeda et al. |
| 2009/0253323 A1 | 10/2009 | Mueller et al. |
| 2009/0321987 A1 | 12/2009 | York et al. |
| 2010/0107512 A1 | 5/2010 | Ellison et al. |
| 2011/0139543 A1 | 6/2011 | Coates et al. |
| 2011/0250814 A1 | 10/2011 | Bradley et al. |
| 2012/0009840 A1 | 1/2012 | Hutchenson et al. |
| 2012/0144611 A1 | 6/2012 | Baker et al. |
| 2012/0258247 A1 | 10/2012 | Niwa et al. |
| 2015/0266265 A1 | 9/2015 | Guzman et al. |

OTHER PUBLICATIONS

Canadian Intellectual Property Office, Examiner's Report for Application No. 2,903,245 dated Sep. 14, 2016.
Transmittal Letter of Related Cases.

THERMAL INSULATION

CROSS-REFERENCE TO RELATED DOCUMENTS

This application claims priority to and is a continuation-in-part under 35 U.S.C. § 120 of U.S. patent application Ser. No. 13/826,943 filed Mar. 14, 2013 and entitled "Thermal and Acoustical Insulation", all of which is incorporated herein by reference.

TECHNICAL FIELD

The present embodiments relate to a thermal insulator or shield. More particularly, present embodiments relate to a single sided tufted thermal insulator or shield.

BACKGROUND

Various types of thermal insulators or insulating shields are known in the art and used in a wide variety of applications including, but not limited to, automobiles, home appliances or other structures and devices necessitating heat insulation.

Thermal insulating shields function by being a radiation thermal shield while other types are conduction thermal shields and may be at least in part fibrous in nature, for example formed of fibrous batts of organic and/or inorganic fibers. These types of insulation are useful where static and dynamic forces are limited on the fibrous insulation. This is important for fibrous insulation shields since these types have limited strength in X, Y or Z directions.

Fibrous batts usually include inorganic fibers such as glass, mineral and clay wool, alumina-silicate, silica fibers and the like to provide sufficient thermal insulation in various applications. However, when such sheets are suspended, the fibrous batt may not have sufficient strength in the Z direction, that is the vertical thickness direction, since there may be insufficient interlocking of the fibers. For example, even under extended static loading of the batts own weight, the insulation may sag. It may be therefore desirable to provide a structure which improves the tensile strength of such fibrous batt in any of the X, Y and including the Z directions.

SUMMARY

According to at least one embodiment a thermal shield material comprises a laminate of a homogeneously blended fiber mat of fiberglass, polyester and bi-component polyester, a plurality of tufts disposed on only one side of the laminate mat, the tufts formed by needling the laminate mat from a single side, first and second pressure sensitive adhesive layers disposed on first and second sides of the blended fiber mat, a foil layer on at least one of the first and second pressure sensitive adhesive layers. The thermal shield material wherein the needling is between about 100 punches per square inch and 2000 punches per square inch. The thermal shield material of the needling being between about 200 punches per square inch and 1000 punches per square inch. The thermal shield material wherein the fiberglass is between about 45 percent and about 70 percent of the mat. The thermal shield material wherein the fiberglass is about 62 percent by weight of the mat. The thermal shield material wherein the fiberglass is about 55 percent by weight. The thermal shield material wherein the PET is about 25 percent by weight and 55 percent by weight. The thermal shield material wherein the PET is about 4 percent by weight and about 3 Denier. The thermal shield material wherein the PET is about 25 percent by weight and 6 Denier. The thermal shield material wherein the PET is between about 5 percent by weight and about 15 denier. The thermal shield material wherein the bi-component PET fiber is about 11 percent by weight. The thermal shield material is about 4/2 denier. The thermal shield material wherein the foil layer is disposed on the tufted side of the laminate. The thermal shield material wherein the shield may be formed in a cold molding process. The thermal shield material wherein the shield is formed one of flat or contoured.

According to some embodiments, a thermal shield material, comprises a laminate of a homogeneously blended fiber mat of fiberglass, polyester and bi-component polyester, the fiberglass being about 7-10 micron and about 50-60% by weight of the fiber mat, the polyester including about 1-10% by weight of 3 Denier fiber, 15-30% by weight of 6 Denier fiber and about 1-10% of 15 Denier fiber, the bi-component polyester fiber being from about 3% to about 15% by weight of the mat, a plurality of tufts disposed solely on one side of the fiber mat, the tufts formed by needling the mat from a single side, first and second pressure sensitive adhesive layers disposed on first and second sides of the blended fiber mat, and, a foil layer on at least one of the first and second pressure sensitive adhesive layers. The thermal shield wherein the bi-component is a 4 Denier sheath/2 denier core Bi-Component fiber. The thermal shield wherein the fiberglass is 7-10 micron E-glass Fiberglass. The thermal shield wherein the polyester is 3-5% by weight of 3 Denier polyester. The thermal shield wherein the polyester is about 23-27% by weight of 6 Denier polyester. The thermal shield wherein the polyester is about 4-6% by weight of 15 Denier polyester. The thermal shield wherein the bi-component polyester is about 10-12% by weight.

According to some embodiments, a thermal shield material, comprises a laminate of a homogeneously blended fiber mat of fiberglass, polyester and bi-component polyester, the fiberglass being about 7-10 micron and about 50-60% by weight of said fiber mat, the polyester including about 2-6% by weight of 1-3 Denier fiber, 23-34% by weight of 3-6 Denier fiber and about 1-10% of 6-15 Denier fiber, the bi-component polyester fiber being from about 3% to about 15% by weight of the mat, a plurality of tufts disposed solely on one side of the fiber mat, the tufts formed by needling the mat from a single side, first and second pressure sensitive adhesive layers disposed on first and second sides of the blended fiber mat, and, a foil layer disposed on said plurality of tufts of first and second pressure sensitive adhesive layers.

According to still other embodiments, a thermal shield material comprises a laminate of a homogeneously blended fiber mat of fiberglass, polyester and bi-component polyester, the fiberglass being about 7-10 micron and about 50-60% by weight of the fiber mat, the polyester including about 1-10% by weight of 3 Denier fiber, 15-30% by weight of 6 Denier fiber and about 1-10% of 15 Denier fiber, the bi-component polyester fiber being from about 3% to about 15% by weight of the mat, a plurality of tufts disposed solely on one side of the fiber mat, the tufts formed by needling the mat from a single side and, a pressure sensitive adhesive disposed on a surface of the blended fiber mat. The thermal shield material may further comprise an aluminum foil or face cloth disposed on a surface of the mat.

According to still other embodiments, a thermal shield material, comprises a laminate of a homogeneously blended fiber mat of fiberglass, polyester and bi-component polyester, the fiberglass being about 7-10 micron and about 50-60% by weight of said fiber mat, the polyester including about 2-6% by weight of 1-3 Denier fiber, 23-34% by weight of 3-6 Denier fiber and about 1-10% of 6-15 Denier fiber, the bi-component polyester fiber being from about 3% to about 15% by weight of the mat, a plurality of tufts disposed solely on one side of the fiber mat, the tufts formed by needling the mat from a single side, and, a pressure sensitive adhesive layers disposed on one surface of said fiber mat. The thermal shield material may further comprise an aluminum or face cloth disposed on a surface of the mat.

According to some embodiments, a thermal shield material includes a laminate of a homogeneously blended fiber mat of fiberglass, polyester and bi-component polyester, a plurality of tufts disposed on only one side of mat, the tufts formed by needling the mat from a single side, first and second adhesive layers disposed on first and second sides of the blended fiber mat, respectively, at least one of the adhesive layers being a heat activated adhesive and, a foil layer on the heat activate adhesive layer.

According to still other embodiments, a thermal shield material, comprises a laminate of a homogeneously blended fiber mat of fiberglass, polyester and bi-component polyester having an internal bond strength of at least 400 Newtons, the fiberglass being about 7-10 micron and about 50-60% by weight of the fiber mat, the polyester including about 1-10% by weight of 3 Denier fiber, 15-30% by weight of 6 Denier fiber and about 1-10% of 15 Denier fiber, the bi-component polyester fiber being from about 3% to about 15% by weight of the mat, a plurality of tufts disposed solely on one side of the fiber mat, he tufts formed by needling the mat from a single side, first and second adhesive layers disposed on first and second sides of the blended fiber mat, and, a foil layer on at least one of said first and second adhesive layers.

All of the above outlined objectives are to be understood as exemplary only and many more objectives of the invention may be gleaned from the disclosure herein. Therefore, no limiting interpretation of the objectives noted is to be understood without further reading of the entire specification, claims, and drawings included herewith.

BRIEF DESCRIPTION OF THE ILLUSTRATIONS

The above-mentioned and other features and advantages of this thermal insulator, and the manner of attaining them, will become more apparent and the invention will be better understood by reference to the following description of embodiments of the invention taken in conjunction with the accompanying drawings, wherein.

DETAILED DESCRIPTION

It is to be understood that the invention is not limited in its application to the details of construction and the arrangement of materials and components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In general, a thermal insulator and method thereof is shown in the various FIGS. 1-4. The thermal insulator includes plurality of fibers which may be either or both of inorganic and organic and which are non-wovens and which may or may not be molded. A binder fiber of material is also utilized in the fibrous batt. The fibers are needled to form tufts on a single side of the fibrous batt. After formation of the single side of tufts, a pressure sensitive adhesive is applied to one side of the tufted batt and a foil layer with an adhesive, which could be a PSA or heat activated but not limited to, is added on the opposite side of the batt. The single sided tufts have sufficient tensile strength in the X, Y and Z direction to support usage even in a suspended configuration. The construction provides for a lightweight thermal insulating material.

Figure 1:
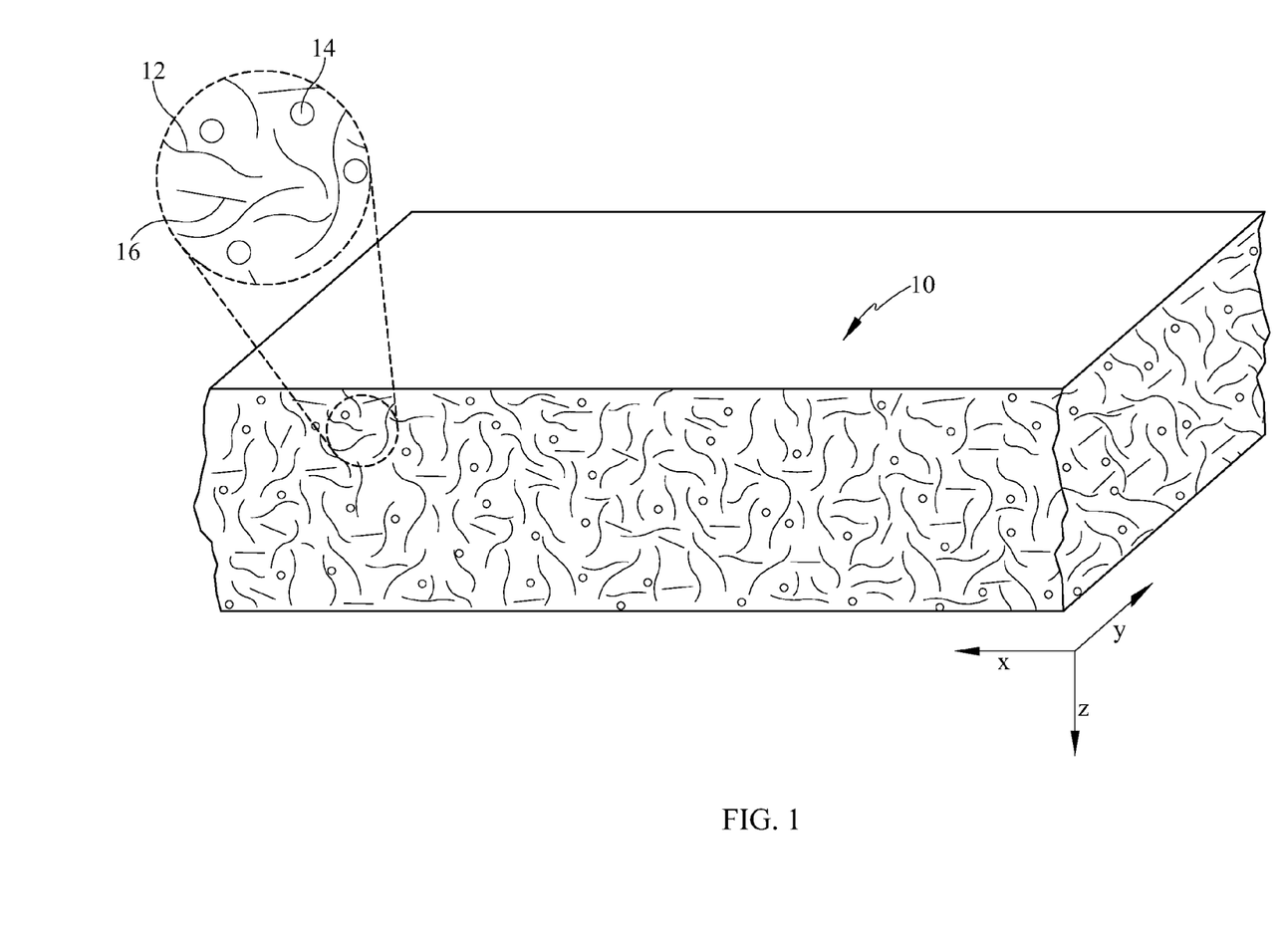
FIG. 1 is a isometric section view of an airlaid batt of insulating fibers.

Referring initially to FIG. 1, an isometric section view of a batt of fibrous material 10 is depicted. The instant insulation material 10 provide thermal insulation characteristics or properties and optionally may also provide acoustical insulating properties as well. The fibrous batt 10 is an airlaid fiber matrix which may be formed of organic or inorganic fibers. Such fibers may include fiberglass, mineral wool, or other inorganic fibers. These inorganic fibers may provide a pre-determined strength. For example, according to one embodiment fiberglass 12 is utilized. The fiberglass 12 may comprise a range of about 20-70 percent by weight of the fibrous batt. More particularly, the fiberglass 12 may be in a range of about 62 percent by weight of the fibrous batt and even more particularly, the fiberglass 12 may be about 55 percent by weight. The internal bond strength of the batt 10 may be insufficient above the about 70 percent by weight content. Such fiber material may have elongation of about 2 to about 3 percent and preferably about 2.1 to about 2.6 percent and more preferably less than about 2.2 to about 2.5 percent. According to one exemplary embodiment, the fiberglass may have a density of about 2.6 grams per cubic centimeter and a hardness of about 5.6.

The thermal insulation mat 10 may vary in weight and thickness in order to vary the thermal conductivity characteristics. A preferred fiberglass mat 10 will be from 6 mm to 76 mm in thickness, for example, before needling. The textile fiberglass fibers, preferably from less than 25 mm to about 83 mm in length and greater than about 5 microns in diameter and less than about 13 microns, are combined to form a thermal insulation mat 10. And, although it is within the scope of this invention to use flame attenuated or rotary fiberglass strands, it is preferable to use textile, for non-limiting example, E-glass, fiberglass which is more durable, less irritable, more economical and therefore preferred in a plurality of applications including for instance the automotive industry.

According to the instant embodiments, the fibrous batt 10 may further comprise a second fiber type 14. In order to increase the internal bond strength, of such batt 10, the second fiber 14 may be, for example, polyester fiber, polypropylene fiber, polyethylene fiber.

According to some embodiments, polyester 14 fibers are utilized. Polyester is a category of polymers which contain the ester functional group in their main chain. Although there are many polyesters, the term "polyester" as a specific material most commonly refers to polyethylene terephthalate (PET). As described herein, the terms polyester and PET are used interchangeably to refer to the same type of fiber. The use or increase of the second fiber type 14, for example polyester 14, provides more fibers of higher tensile strength to entangle with the remainder of the matrix and results in a higher composite internal bond strength, or tensile strength.

According to instant embodiments, the insulation batt 10 may comprise a polyester material in the range of about 10 to about 70 percent by weight. More preferably the polyester may be from about 30 to about 60 percent by weight of the insulation. Even more preferably, the polyester 14 may be about 45% by weight of the batt 10. The polyester 14 is generally a synthetic material which wears well and has low moisture absorbency. The polyester 14 may be a thermoplastic or thermoset material and is suitable for use in blended mixtures as described herein. The polyester 14 may have a range of 0.5 to about 15 Denier and a tenacity of about 2.0 to about 7 and more preferably about 2.7 to about 4.7 (grams/Denier). The polyester 14 may have a percentage elongation at break of about 15 to about 45 percent. Further the polyester 14 may have a softening temperature about 230 to about 240 degrees Celsius with a melting point of about 250 to about 288 degrees Celsius.

The polyester fiber 14 may be comprised of one or more Denier sizes and may be sized from about 1 to about 30 denier. For example, according to some embodiments, a 3 Denier polyester fiber may be utilized. According to other embodiments, 6 Denier polyester fiber may be utilized. According to still other embodiments, 15 Denier polyester fiber may be utilized. These fibers 14 may be pure or virgin polyester, or alternatively may be recycled polyester. When virgin polyester is utilized, it may be generally available in specific denier sizes, such as the specific sizes described above, for example, or available in fiber ranges. Additionally, recycled polyester is generally available in ranges of, for example as related to the above recited distinct sizes, 3 to 6 Denier and 13 to 16 Denier fiber size, but may also be purchased in distinct sizes.

According to one example, the polyester fiber 14 may be staple fiber having the characteristics of 3 Denier plus or minus one-half Denier and about 40 to about 60 mm in length, and preferably about 51 mm in length. Further the fiber may be round in cross section with a tolerance of about 15%. Further, the 3 Denier polyester may have elongation of about 45% and tenacity of about 3.5 grams/Denier. The fiberglass may have shrinkage of up to about 3% under hot air of about 180 degrees Celsius. Additionally, the exemplary fiberglass may be round in cross section but other shapes may be suitable as well.

According to another example, the polyester fiber may be 6 Denier and have a tenacity of about 4 grams/Denier. Such exemplary fiber may further have an elongation of about 65% and fiber length of about 52 mm.

As a further, non-limiting, example it has been found that a 15 Denier polyester fiber may be suitable as well. According to some examples, the 15 Denier fiber had a tenacity of 4 grams per Denier and an elongation of about 65%. The fiber may have a length of about 51 mm.

It may also be desirable to utilize recycled polyester in whole or in part. As mentioned previously, recycled polyester is generally available in size ranges as well as specific Denier sizes. As may be understood by one skilled in the art, it may be more cost efficient to purchase fibers of size ranges than specific sizes. Accordingly, it may be suitable to utilize fiber size ranges including polyester fibers having 3 to 6 Denier for one of the fiber sizes. Similarly it may be desirable to utilize fiber size range in the order of about 4 to 7 Denier. Further, it may be suitable to utilize polyester fiber having a size range of about 13-16 Denier. While these size ranges are provided for description, they are merely exemplary as various ranges may be utilized while staying within the scope of the instant disclosure.

As shown in the following Table I, a number of test samples were manufactured at specific Denier sizes and with varying percentage.

TABLE I

|  |  | Denier | | |
|---|---|---|---|---|
|  |  | 3D | 6D | 15D |
| Percent Polyester | 1. | 2% | 40% | 3% |
|  | 2. | 0 | 50 | 5 |
|  | 3. | 5 | 4 | 0 |
|  | 4. | 0 | 50 | 0 |
|  | 5. | 45 | 0 | 0 |
|  | 6. | 0 | 0 | 70 |
|  | 7. | 58 | 3 | 2 |
|  | 8. | 10 | 30 | 10 |

According to a Table II, another group of samples were manufactured having fiberglass and the above recited polyester fibers, including the addition of bi-component.

TABLE II

|  |  | Fiber Size | | | | |
|---|---|---|---|---|---|---|
|  |  | Fiberglass | Polyester | | | |
|  |  | 7-9 Micron | 4/2 D | 3D | 6D | 15D |
| Percent by Weight | 1. | 74% | 10% | 4% | 7% | 5% |
|  | 2. | 68% | 13% | 5% | 8% | 6% |
|  | 3. | 32% | 16% | 6% | 37 | 9% |
|  | 4. | 38% | 15% | 6% | 34 | 7% |
|  | 5. | 45% | 13% | 5% | 30 | 7% |
|  | 6. | 55% | 11% | 4% | 25 | 5% |

While the sizes and ranges discussed have been described as being utilized exclusively, it has also been determined that a combination of various denier sizes may also be desirable for optimizing the strength of the laminate. For example, according to one exemplary embodiment, and not by way of limitation, a combination of sizes and/or ranges may also be utilized and include 4 percent by weight of a 3 Denier PET may be utilized with 25 percent by weight of 6 Denier PET and additionally 5 percent by weight of 15 Denier PET.

Similarly, combinations of ranges of fiber size may be utilized. For example, according to one exemplary embodiment, 2-5 Denier fiber in the range of up to about 10 percent, 3-6 Denier fiber in the range of up to about 55 percent and 13-16 Denier fiber of up to about 10 percent. For purpose of clarity, it should be understood that the percent by weight described is percent of the batt 10, not a percentage of polyester fiber solely. While the instant example utilizes three ranges in order to define the polyester fiber 14, it should be understood that fewer or more amounts of fibers may be utilized. As a result of these exemplary embodiments, bond strength may be improved in the lamination process which further sets the PET fibers and an adhesive layer to the fiber matrix 10.

According to Table III, an additional group of samples were manufactured. However, this sample utilized a number of Denier ranges rather than specific sizes. The samples of Tables I-III provided a matrix of data that allowed determination of suitable fiber sizes, ranges and amounts.

TABLE III

|  |  | Denier Range | | |
| --- | --- | --- | --- | --- |
|  |  | 1-3D | 3-6D | 6-15D |
| Percent Polyester | 1. | 10 | 20 | 10 |
|  | 2. | 0 | 50 | 10 |
|  | 3. | 10 | 50 | 5 |
|  | 4. | 5 | 40 | 0 |
|  | 5. | 3 | 40 | 2 |
|  | 6. | 0 | 20 | 0 |

With regard to the above described size, ranges and percentages, one skilled in the art will understand that manufacturing tolerances may vary as much as 10-15 percent and such manufacturing tolerance amounts above or below stated characteristics of the fibers and/or the mat 10 are well within the scope of the instant disclosure and appended claims.

Polypropylene may also be utilized in formation of the thermal insulation material. The polypropylene may be in the order of about 0 to 20 percent by weight and more preferably about 6 to about 12 percent by weight of the acoustical insulation batt 10. The polypropylene may be in fibrous form and be from about 1 to about 30 Deniers. More preferably the polypropylene may be about 6 Denier material.

In addition to the fiberglass 12 and PET 14, a binder material 16 may be utilized in the fibrous batt 10. For example, according to some embodiments, bi-component polyester fiber 16 may be utilized. In accordance with one aspect of the batt 10, an organic binding fiber may be a polyester, polypropylene bi-component or PET bi-component thermal bonding fiber which utilizes two components within a single filament. The bi-component fibers may have at least two polymers or resins of differing chemical and/or physical properties with both polymers formed into a unitary filament or fiber. For example, one polymer functions as a structural component and the other functions as a binding component. The structural component typically has a higher melting point than the binding component so that the binding component melts first during heating and the thermal insulation is formed during heating to the lower melting temperature of the binding component, the other components of the entire thermal insulation are bonded together. In this manner, the higher meting point structural component stays in fibrous form to provide further strength and structure to the non-woven acoustical insulation and generally along the length of the single fiber lengths of the bi-component fibers. The airlaid matrix or batt 10 may include in some examples a 4/2 denier bi-component material. The designation of 4/2 Denier refers to the outer sheath (4 Denier) and inner core (2 Denier) characteristic of the fiber material. The bi-component may be, for non-limiting example, 11 percent by weight of the matrix. However, various alternate amounts may be utilized so that the bi-component may be up to 25 percent by weight and as low as 1 percent by weight. Alternative denier sizes may be utilized.

Additionally, the bi-component fiber may be utilized in arrangements other than sheath-core. For example, the bi-component may be formed in side-by-side arrangement, island-sea arrangement or alternate configuration. Bi-components are known for their relatively high strength as related to elongation and break-strength and may be modified to enhance cutability of the non-woven acoustic material and additionally, if desirable, the moldability of the non-woven material. The molded acoustical insulation may be cut manually or in an automated process, such as by water jet or other automated system such as a die cutter. To provide these characteristics, the bi-component fibers have a pre-determined strength which is substantially similar to the inorganic base fiber and other components of the core, which is a reduced strength as compared to commercially available bi-component fibers. Commercially known bi-component fibers are generally utilized and known for their relatively high strength so that the warmed non-woven material also is conformable in either a hot or cold molding process. To this end, it is desirable that the bi-component fibers have a pre-determined strength which is substantially similar to the other components used in the insulation material so that the combination performs in a pre-selected manner.

In this regard, once the mat is heated to melting temperature of the binding, lower melting polymer, it melts to bind the other ingredients together. The higher melting point polymer remains intact in a fibrous form to provide further strength and structure to the non-woven material. When cooled, the plurality of bonds are generally created along the fiber lengths in the base mat.

As previously mentioned, the binding component of the bi-component fiber may have a lower melting point than the other structural component. According to one exemplary embodiment, the binding component may have a melting point of about 100 to about 120 degrees Celsius. However, bi-components may have sheaths of various melt temperatures, for example up to 220 degrees Celsius. The structural component of the bi-component fiber may have a melting point of 250 to about 288 degrees Celsius. Thus the binding component may have a melting point of about 110 degrees to about 230 degrees Celsius lower than the melting point of the structural component of the bi-component fibers.

The bi-component fiber may have a linear density, known in the art as a Denier, of about 4/2 Denier or according to some alternatives, 6/3 Denier. However, various Denier ranges may be suitable depending upon the formulation desired by the acoustical mat designer. The bi-component fibers may preferably have a fiber length of about 40 to about 60 mm while most preferably between about 47 and about 53 milliliters.

According to some embodiments, it may be possible to remove the usage of bi-component material. For example, if the fiber batt 10 is needled immediately after airlay, then it is possible that the bi-component material may be removed from the mixture.

Fiber break load is generally proportional to the Denier of a fiber. Typically the finer the fiber, the better the cutability of the media. As utilized in the instant disclosure, by way of example, for the automotive industry, the bi-component fibers may have a break load and percentage elongation of about 40% to about 70%.

The mixture of fiberglass, polyester and bi-component polyester is airlaid and cured in an oven. The batt or matrix of material is airlaid according to the instant embodiments. The airlay process distributes the fiber in random orientation imparting a preliminary amount of fiber entanglement. This may be superior to carded or cross-lapped fibers since those processes more uniformly lay the fiber which decreases the amount of entanglement of the fibers.

Figure 2:
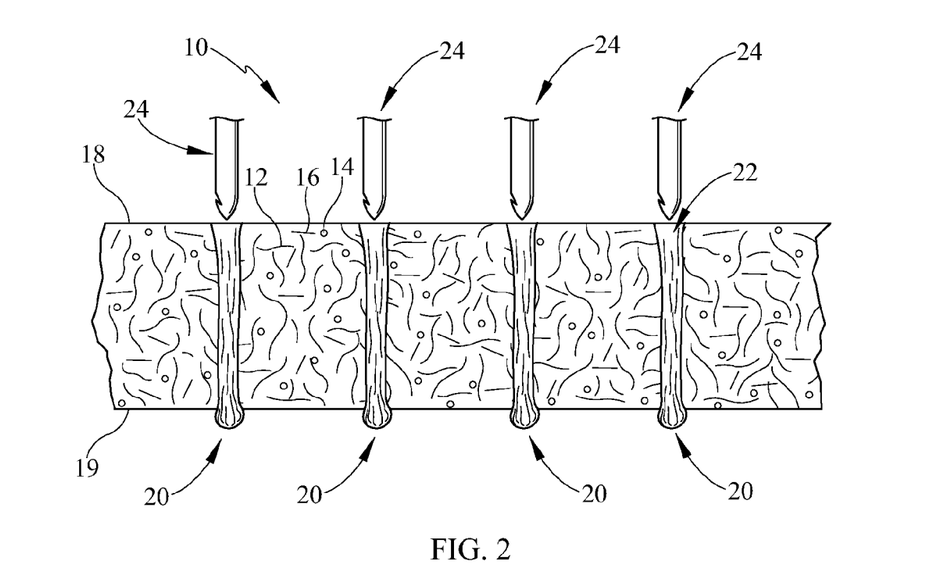
FIG. 2 is a side section view of the batt of FIG. 1 after needling.

Referring now to FIG. 2, a side section of the batt 10 is depicted with needled apertures 22. After the fiber batt 10 is formed, the batt or matrix is processed with a plurality of needles 24 to additionally entangle the fiber components of the batt. In the needling process, the plurality of needles 24 are moved through the fibrous batt 10 from a first side 18 to a second opposite side 19. The needles exit the opposite side 19 of the batt 10 and produce a plurality of tufts 20 on such opposite side of the batt 10. According to the instant embodiment, the needling process only occurs from a single side, rather than a double sided needling. The number and type of needles 24 utilized may vary but should be at least between about 10 punches per square inch (PPSI) and 3000 punches per square inch. According to some embodiments, the needling density may be 15 punches per square inch up to 2000 punches per square inch depending on the needle design used. Beyond an upper limitation of about 2000 punched per square inch described, the needling process appeared to show a very limited improvement on bond strength relative to the work being done to increase the punches per square inch. According to the current manufacturing process, the apertures 22 may be formed on a downward needle stroke. However, it is within the scope of the instant embodiment that the needling process occur on the upward stroke from the opposite side of the depicted embodiment and still be within the scope of the instant claims since such embodiment would still provide a one-sided needling. During the needling process, the fibrous batt 10 is positioned on a bed plate and needles are allowed to pass through the bed plate by varying distances. According to some embodiments, the tufts 20 created by the needles 24 passing through the fibrous batt 10 and the bed plate may have a length of about ⅛ inch. However, the tuft lengths may differ depending on the length of needle which passes beyond the bed plate.

Because of the many variations available in needle design and needle process settings, it is noteworthy that the same internal bond strength can be achieved with different PPSI results. Therefore, punches per square inch (PPSI) should not always be used as the target design criteria, but more as a guide. One criteria for this product should be measured by internal bond strength. It has been determined that the target internal bond strength should be 400N or greater when tested on an Instron, or similar piece of equipment, using 4 inch square samples and pulled at a crosshead speed of 25 mm/min. This test gives a true measurement of Z-direction strength. In some embodiments, the internal bond strength may be up to 1000N, however, this is exemplary and higher upper limits are possible.

Figure 3:
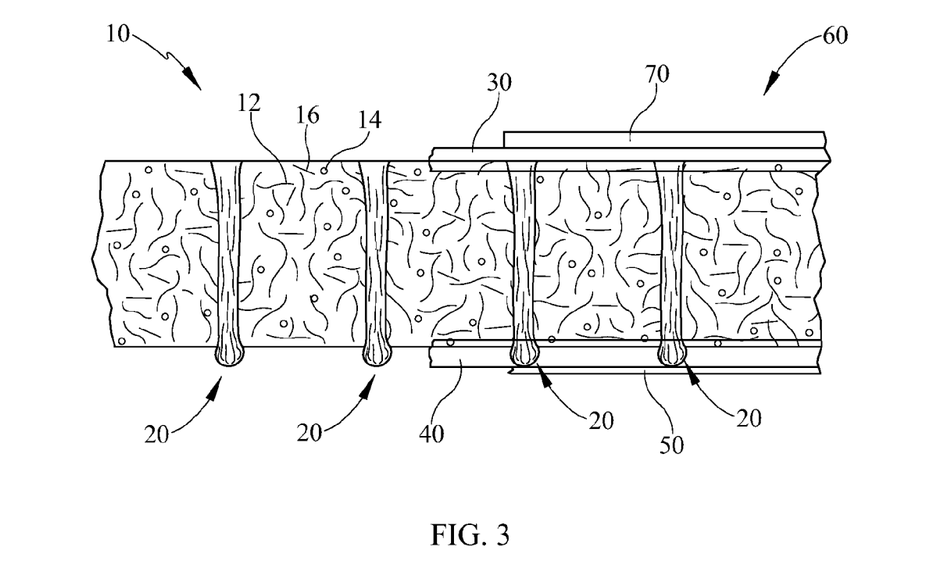
FIG. 3 is a side section view of the needled batt with a pressure sensitive adhesive and foil applied.

Referring now to FIG. 3, a side section view of the thermal and acoustical shield 60 is depicted. The needled batt 10 includes first and second adhesive layers 30, 40, a release liner 70 and a foil layer 50. The adhesives 30, 40 may be the same or may be differing adhesives as desired. The adhesives 30, 40 may be, for example, a pressure sensitive-, or a heat activated system wherein the adhesive has a thickness of 2 to about 6 mills (0.09 to about 0.12 mm). For example, suitable adhesives may be available from 3M or Avery Dennison which allow for laminating of fiber blended product wherein high initial tack and adhesion are desirable. These adhesives may be selected based on various characteristics including but not limited to the operating temperature which the adhesive will be exposed to at its end use. The difference between a pressure-sensitive adhesive and a heat-activated adhesive will be understood by one skilled in the art and can easily be inferred by their naming convention, but in general a pressure—sensitive adhesive is one where the bonding occurs as a result of applied pressure whereas a heat-activated adhesive is one that needs to be subjected to heat in order to render the adhesive fluid or tacky prior to application to the target substrate or substrates. Some adhesives may require both heat and pressure and therefore may be classed as either heat-activated or pressure sensitive.

According to some embodiments, the adhesive 30 may include a release liner for removal and application to a substrate. The release liner 70 may be, for non-limiting example, a densified kraft or a polyester. This may be applied integrally with the adhesive 30 or may be formed separately and later applied during manufacturing.

As desired, the adhesive 40 includes the foil layer 50 and may have a higher heat resistivity than adhesive 30. For example, adhesive material 30 may be a high-tack pressure sensitive modified acrylic and the adhesive material 40 may be, but is not necessarily limited to a high heat resistant pressure sensitive modified acrylic, a heat activated silicone, PET, phenolic, rubber or urethane. According to some embodiments, the heat sensitive adhesive may have a higher heat resistivity which is desirable in a number of situations. For example, for purpose of direct flame testing, it may be necessary that flame resistance be improved. Still further, some manufacturers may require a self-extinguishing product. Silicone may be more stable when exposed to a direct flame, and therefore less likely to burn. A heat activated silicone may provide such functionality. As an alternative for example, phenolic may be utilized to provide high heat resistance and self-extinguishing characteristics. Other products may be added to provide a desirable self-extinguishing function, but may not be as suitable or may be more cost prohibitive than using a heat activated adhesive.

The batt 10 forms a core for adhesives 30, 40 and the foil 50. As shown in the depicted embodiment, the adhesives 30, 40 pass slightly beyond the outer surfaces of the batt 10 to adhere with the fibrous materials 12, 14, 16. The foil layer 50 is directed toward the tufted side of the thermal shield 60. The foil layer is applied to a single side, that side being a side which is subjected to high heat such as along the exhaust path of an automobile, for example, adjacent to a catalytic converter. One criteria for strength of the thermal shield 60 is peel strength. To achieve the highest peel strength, the adhesive 30 should be positioned on the needled side 18 of the substrate and the adhesive 40 with the foil layer 50 be positioned on the tufted side 19. According to some embodiments, the foil layer 60 may be integral with the adhesive 40. According to other embodiments, the two materials may be separate and the foil layer applied to the adhesive layer 40. The instant embodiments may include a foil layer which is 2 mils in thickness (0.05 mm) although various thickness dimensions may be suitable up to about 10 mils thick. For example, several exemplary products, may include, but are not limited to, a high tack acrylic, high tack silicone, a heat activated silicone, urethane, phenolic, rubber, PET adhesive any of which may be integrated with the aluminum foil layer. The adhesive used should have a high temperature resistance that can operate in environments where constant temperatures are greater than 175 degrees Celsius.

According to some embodiments, if adhesive layers 30, 40 are pressure sensitive, they may be positioned on the batt without the use of heat. However, it may be desirable to increase throughput of the batt 10 during manufacturing and therefore, such increased throughput speed may be achieved through use of heat with the application of the pressure sensitive adhesive layers 30, 40. The heat allows the pressure sensitive adhesive to have improved flow rate and seep further into the fiber layers of the batt 10. This creates a stronger bond and therefore, may be a preferable method of manufacture. For example, one means of providing this function may be achieved through the use of a bank of infrared heaters prior to nip rollers which may also be heated. However, this is not exclusive as other means of heating the fibers and/or the pressure sensitive adhesive may be utilized. These embodiments of pressure sensitive adhesives may also include release liners, such as polyester based or kraft paper materials. The release liners on the batt side of the shield 60 are removed, if utilized, when the adhesive is applied to the shield 60. However, an opposite release liner 70 may remain on the shield 60 until it is applied to a product in a manufacturing, such as an automobile for example.

Once the batt 10 is needled and the adhesives 30, 40 and foil 50 are applied to the batt 10, the structure may be die cut. Such die cutting procedure is known to one skilled in the art and will be understood. Various shapes may be cut by varying the shape of the die cutting tool. After cutting the thermal shield 60 may be applied to a surface indicated for thermal and acoustical shielding.

Optionally, it may be desirable to form the mat 10 without the foil layer 50 or adhesive 40. Such usage may be desirable for interior acoustical treatment, in a vehicle for example, and wherein the nature of the heat source does not necessitate. Such mat 10 may include a adhesive on a single side of the mat 10. Any of the various embodiments of the fibers, types, sizes and ranges previously described may be utilized according to this embodiment. Optionally, the foil layer 50 and adhesive layer 40 may be replaced with a non-woven facecloth. The facecloth may for example be made of, but are not limited to, a polyester or polyester and rayon blend and have a weight in the range of 17 to 200 grams per square meter. Additionally, the facecloth may or may not have an adhesive system applied. An example of the adhesive system, but not limited to, would be a scatter coated EVA, LDPE or cross-linking phenol.

Figure 4:
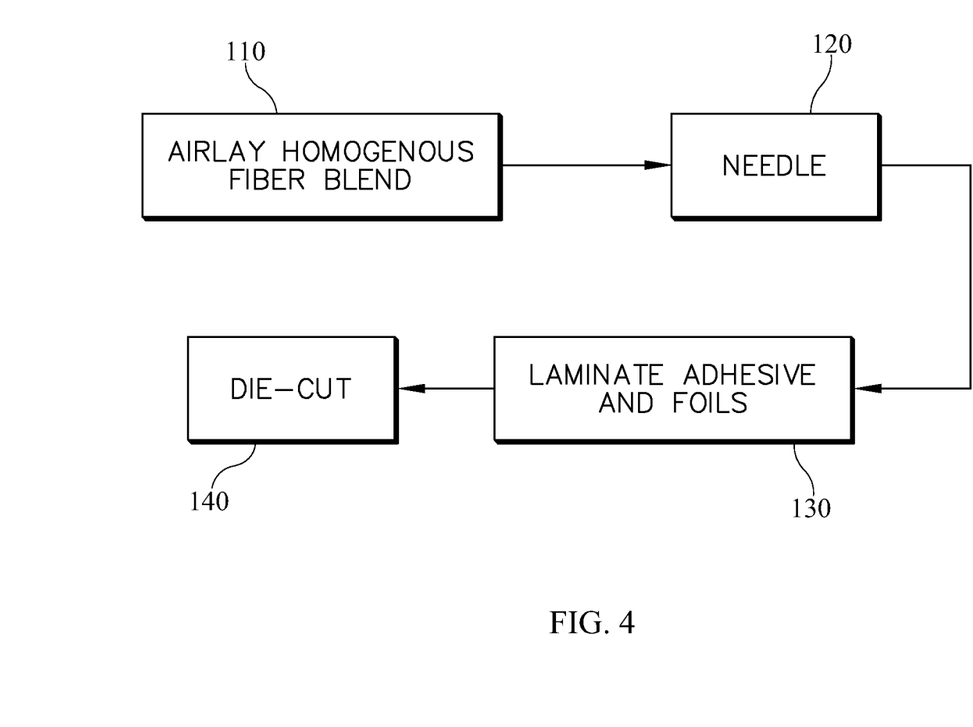
FIG. 4 is a flow chart of the process for making the thermal insulator of FIG. 3.

Referring now to FIG. 4, a process flow chart for producing the thermal shield 60 is depicted. First at step 110, an airlay of homogenous fiber blend or batt 10 is produced. In the manufacture of a product of the present invention, a fiber-binder complex mix is required and formed in an airlay process and heated to at least about 230 degrees Fahrenheit to tack the mat 10 prior to needling. During this airlay process the orientation of the fibers is predetermined by the machine settings and fiber selection. Once the material is airlayed it is then transferred through a series of ovens with a predetermined temperature and dwell time that will activate the bi-component fibers, imparting a bonding of the fiber matrix, and exiting the ovens set at a specific thickness or density. At this point the fiber mat is no longer comprised of individual components but rather an engineered matrix of bonded fibers. As a result of this phenomena, whenever needling the mat a plurality of fiber are moved rather than just individual fibers. By passing through the ovens, this unique portion of the process imparts characteristics on the mat unseen by solely airlaying or carding and cross lapping. With this matrix it is possible to achieve a product of high internal bond strength by needling in one direction and yielding all the final characteristics desired. Second at step 120, the fibrous batt 10 is needled producing the needled side 20 and the tufted side 19 having a plurality of tufts 20. Next the laminate adhesives 30, 40 are applied at step 130 and the foil side 50 is additionally applied to the tufted side of the fibrous batt 10 outside of the adhesive 30, 40. These steps of applying may occur simultaneously or may occur separately. Further, the adhesive 40 and foil 50 may be applied together or may be applied separately.

Optionally, heat and pressure may be applied to cure or mold the product if desirable prior to the die cutting step. During the curing or molding process, the application of heat causes the thermo-plastic to further stretch and non-uniformly increase the density. In the forming process, the shield 60 will be completely cured and set into a desired shape and thickness. Any type of mold known in the art may be used, such as rotary molds, double shuttle molds, non-shuttle molds and roll loader molds. Each of the molds is generally driven by either hydraulic or air cylinders which generate between 1 and 1000 psi of molding pressure. Depending upon the thickness and density of the mat to be molded, the cycle times will vary from 15 seconds to 3 minutes with the mold temperatures being 200 to 500 degrees Fahrenheit. The finished molded product 60 will generally be from 2 mm to 12 mm thick. A more desirable range may be about 4 to about 8 mm thick. The shield 60 is then ready for use and may be cut by any well-known means to a preselected size and shape.

In the alternative, the shield 60 may also be molded in a cold molding process. In this process, the shield 60 is preheated to between about 200 to 500 degrees Fahrenheit and then placed in a cold mold and chilled as pressure is applied during formation. After molding the shield 60 may be cut to any preselected size and shape. For example, the cold molded shield may be flat and then cut to a desired shape or may be contoured and cut to the desired shape.

Finally at step 140, the thermal shield 60 is cut with a die to a desired shape at which time the thermal shield 60 may be applied to various structures including, but not limited to automotive uses. For example, the acoustical shield 60 is placed about an enclosure where thermal insulation is desired. For example, the material may be utilized in engine compartments, vehicle underbodies, as under floor carpets and as fuel tank protection. Other locations may utilize the material as well and this list should not be considered limiting, for example as a liner opposite exhaust systems of the vehicle.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A thermal shield material, comprising:
   a laminate of:
   a homogeneously blended fiber mat of fiberglass, polyester and bi-component polyester;
   a plurality of tufts disposed on only one side of mat, said tufts formed by needling said mat from a single side;
   first and second adhesive layers disposed on first and second sides of said blended fiber mat, respectively;
   at least one of said adhesive layers being a heat activated adhesive; and,
   a foil layer on said heat activate adhesive layer.

2. The thermal shield material of claim 1, said blended fiber mat having an internal bond strength greater than 400 Newtons.

3. The thermal shield material of claim 1, said fiberglass being between about 30 percent and about 70 percent of said mat.

4. The thermal shield material of claim 1, said fiberglass being about 62 percent by weight of said mat.

5. The thermal shield material of claim 1, said fiberglass being about 55 percent by weight of the mat.

6. The thermal shield material of claim 1, said polyester being between about 20 percent by weight and 70 percent by weight of said mat.

7. The thermal shield material of claim 1, said polyester being 4 percent by weight and about 3 Denier.

8. The thermal shield material of claim 1, said polyester being about 25 percent by weight and 6 Denier.

9. The thermal shield material of claim 1, said polyester being about 5 percent by weight 15 Denier.

10. The thermal shield material of claim 9, said bi-component polyester fiber being about 11 percent by weight.

11. The thermal shield material of claim 10, said bi-component being 4/2 denier.

12. The thermal shield material of claim 1, said foil layer being disposed on the tufted side of said laminate.

13. The thermal shield material of claim 1 wherein said laminate is formed in one of a cold molding process or a hot molding process.

14. The thermal shield material of claim 13, wherein said laminate is formed one of flat or contoured.

15. A thermal shield material, comprising:
   a laminate of:

a homogeneously blended fiber mat of fiberglass, polyester and bi-component polyester having an internal bond strength of at least 400 Newtons;
said fiberglass being about 7-10 micron and about 50-60% by weight of said fiber mat;
said polyester including about 1-10% by weight of 3 Denier fiber, 15-30% by weight of 6 Denier fiber and about 1-10% of 15 Denier fiber;
said bi-component polyester fiber being from about 3% to about 15% by weight of said mat;
a plurality of tufts disposed solely on one side of said fiber mat, said tufts formed by needling said mat from a single side;
first and second adhesive layers disposed on first and second sides of said blended fiber mat; and,
a foil layer on at least one of said first and second adhesive layers.

16. The thermal shield of claim 15, said bi-component being a 4 Denier sheath/2 denier core Bi-Component fiber.

17. The thermal shield of claim 15 wherein said fiberglass is 7-9 micron E-glass Fiberglass.

18. The thermal shield of claim 15, said polyester being 3-5% by weight of 3 Denier polyester.

19. The thermal shield of claim 15, said polyester being 23-27% by weight of 6 Denier polyester.

20. The thermal shield of claim 15, said polyester being 4-6% by weight of 15 Denier polyester.

21. The thermal shield of claim 15, said bi-component polyester being 10-12% by weight.

22. A thermal shield material, comprising:
a laminate of:
a homogeneously blended fiber mat of fiberglass, polyester and bi-component polyester having an internal bond strength of 400 Newtons;
said fiberglass being about 7-10 micron and about 50-60% by weight of said fiber mat;
said polyester including about 2-6% by weight of 1-3 Denier fiber, 23-34% by weight of 3-6 Denier fiber and about 1-10% of 6-15 Denier fiber;
said bi-component polyester fiber being from about 3% to about 15% by weight of said mat;
a plurality of tufts disposed solely on one side of said fiber mat, said tufts formed by needling said mat from a single side;
first and second adhesive layers disposed on first and second sides of said blended fiber mat; and,
a foil layer disposed on one of said first or second adhesive layers.

23. A thermal shield material, comprising:
a laminate of:
a homogeneously blended fiber mat of fiberglass, polyester and bi-component polyester having an internal bond strength of greater than 400 Newtons;
said fiberglass being about 7-10 micron and about 50-60% by weight of said fiber mat;
said polyester including about 1-10% by weight of 3 Denier fiber, 15-30% by weight of 6 Denier fiber and about 1-10% of 15 Denier fiber;
said bi-component polyester fiber being from about 3% to about 15% by weight of said mat;
a plurality of tufts disposed solely on one side of said fiber mat, said tufts formed by needling said mat from a single side; and,
a pressure sensitive adhesive disposed on a surface of said blended fiber mat.

24. The thermal shield material of claim 23 further comprising a face cloth disposed on a surface of said mat.

25. The thermal shield material of claim 24 further comprising an adhesive to adhere said face cloth to said mat.

26. A thermal shield material, comprising:
a laminate of:
a homogeneously blended fiber mat of fiberglass, polyester and bi-component polyester with a bond strength of at least 400 Newtons;
said fiberglass being about 7-10 micron and about 50-60% by weight of said fiber mat;
said polyester including about 2-6% by weight of 1-3 Denier fiber, 23-34% by weight of 3-6 Denier fiber and about 1-10% of 6-15 Denier fiber;
said bi-component polyester fiber being from about 3% to about 15% by weight of said mat;
a plurality of tufts disposed solely on one side of said fiber mat, said tufts formed by needling said mat from a single side; and,
an adhesive layer disposed on one surface of said fiber mat.

27. The thermal shield material of claim 26 further comprising a face cloth disposed on a surface of said mat.

28. The thermal shield material of claim 27 further comprising an adhesive to adhere said face cloth to said mat.

* * * * *